United States Patent [19]

Pouillange

[11] Patent Number: 4,918,997
[45] Date of Patent: Apr. 24, 1990

[54] VERNIER TORQUEMETER

[75] Inventor: Jean Pouillange, Gressy, France

[73] Assignee: CGEE Alsthom, Perret, France

[21] Appl. No.: 169,535

[22] Filed: Mar. 17, 1988

[30] Foreign Application Priority Data

Mar. 17, 1987 [FR] France .................. 87 03638

[51] Int. Cl.$^5$ .............................................. G01L 3/10
[52] U.S. Cl. .................................................. 73/862.34
[58] Field of Search ...................................... 73/862.34

[56] References Cited

U.S. PATENT DOCUMENTS 3,504,538 4/1970 Andrews et al. ................. 73/862.34
3,505,865 4/1970 Kihlberg et al. .................. 73/862.34

FOREIGN PATENT DOCUMENTS 1281339 7/1972 United Kingdom ............. 73/862.34

Primary Examiner—Charles A. Ruehl
Attorney, Agent, or Firm—Sughrue, Mion, Zinn, Macpeak & Seas

[57] ABSTRACT

The invention relates to a vernier effect torquemeter. It provides a device for measuring twists between first and second sections (A, B) of a shaft, while the shaft is rotating, the device being characterized in that it comprises:

first means (21) fixed to the shaft at said second section for generating information representative of the phase at said second section and transmitting said information to the vicinity of said first section;

a first heteropolar vernier inductor (23, 24) including a component which is fixed to said shaft at said first section and receiving said information at its other component and amplifying it in the form of a phase shift of a first resulting magnetic induction (25) attached to a reference on the shaft and rotating therewith;

a first stationary bi-polar receiver (28) picking up said magnetic induction;

a second stationary bi-polar receiver (29) picking up second magnetic induction related to the reference on the shaft (27) said induction being provided by second means (26) and constituting a phase reference; and a phase comparator (30) receiving the signals provided by said receivers at its inputs and providing an output signal proportional to the phase difference between said signals, and thus to said angle to twist. It is applicable to measuring torque.

7 Claims, 5 Drawing Sheets

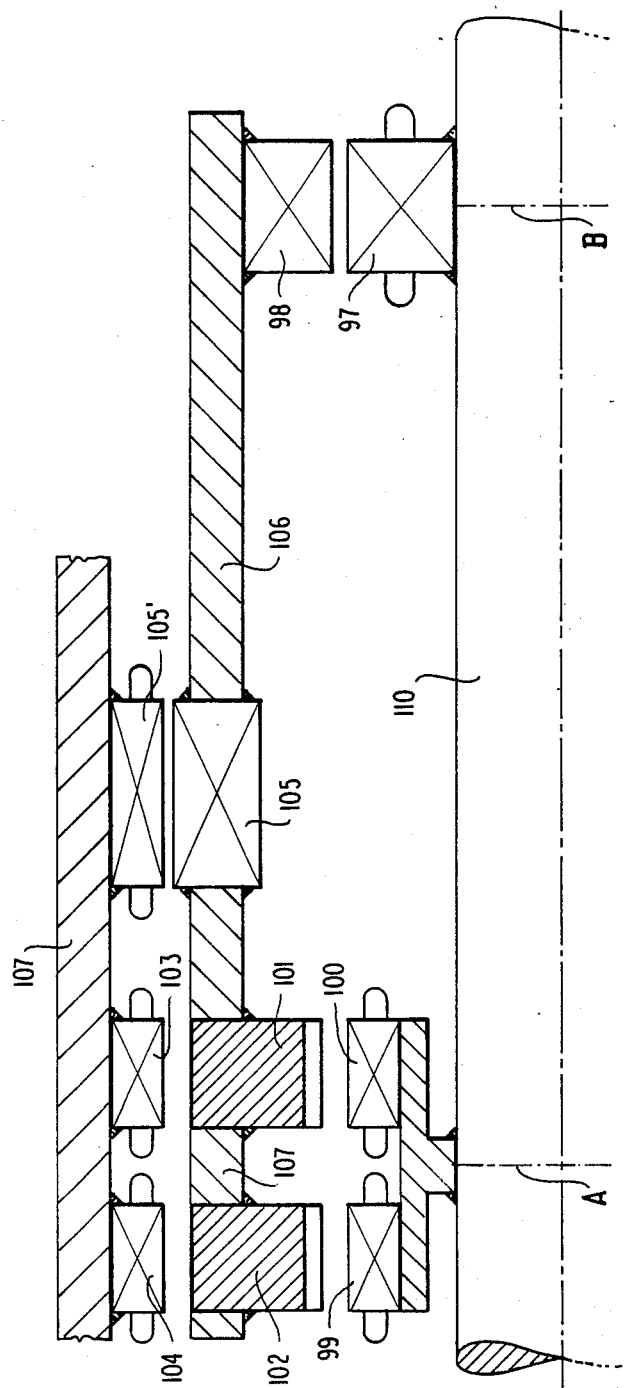

4,918,997

VERNIER TORQUEMETER

The present invention relates to a vernier torquemeter.

FIG. 1 shows a prior art torquemeter. It includes a length of shaft 1 and serves to measure the twist existing between two sections A and B on said shaft, said sections being disposed in the vicinity of respective ends of the length of shaft 1. The rotors 2 and 3 of two identical alternators are fixed to the sections A and B. The rotors are associated with respective pick-ups 4 and 5 fixed to a common frame 6 which is connected to the shaft 1 via bearings 7 and 8.

The pick-ups 4 and 5 are electrically connected via connections 9 and 10 to a phase comparator 11. The measured phase difference is proportional to the twist existing between sections A and B.

Flanges 12 and 13 enable the apparatus to be inserted in a line of shafts including shafts 14 and 15 fitted with flanges 16 and 17.

The torque exerted by a drive shaft 14, for example, on the driven shaft is proportional to the twist between points A and B.

The torque is therefore proportional to the measured phase difference.

If the frequency of rotation of the shaft is N and the number of pairs of poles in the alternators is the frequency of the induced current is nN. If the angle of twist between A and B is written $\phi$, then the phase difference corresponds to $n\phi$ measured at the frequency nN.

Assuming that the limit of phase measurement accuracy is given by a smallest time interval $dt_O$ between the waves emitted by the stators 4 and 5, then the smallest detectable twist angle $\phi_0$ is related to $dt_O$ by the equation:

$$dt_O < \phi_0/2\pi N$$

It can be seen that measurement difficulty increases with increasing speed, and unfortunately the speed is imposed on the system in which torque is to be measured and cannot be selected for facilitating measurement.

The sensitivity of the apparatus could be increased by reducing the cross-section of the shaft. However such a reduction makes the line of shafts more fragile by giving rise to low critical twisting frequencies.

An object of the present invention is to provide a torquemeter whose sensitivity on a given twistable shaft is multiplied by a factor of several tens.

The invention provides a device for measuring twists between first and second sections of a shaft, while the shaft is rotating, the device being characterized in that it comprises:

first means fixed to the shaft at said second section for generating information representative of the phase at said second section and transmitting said information to the vicinity of said first section;

a first heteropolar vernier inductor including a component which is fixed to said shaft at said first section and receiving said information at its other component, and amplifying it in the form of a phase shift of a first resulting magnetic induction attached to a reference on the shaft and rotating therewith;

a first stationary bi-polar receiver picking up said magnetic induction;

a second stationary bi-polar receiver picking up second magnetic induction related to the reference on the shaft, said induction being provided by second means and constituting a phase reference; and a phase comparator receiving the signals provided by said receivers at its inputs and providing an output signal proportional to the phase difference between said signals, and thus to said angle of twist.

Advantageously, said first heteropolar vernier inductor comprises a ring of 2p alternating poles, together with magnetic toothing comprising $p \pm 1$ teeth.

In a particular embodiment, said second means is a 2-pole alternator.

Preferably, said second means is a heteropolar vernier inductor comprising a ring of 2p poles in phases with the preceding magnetic toothing comprising $p \pm 1$ teeth.

In a particular embodiment, the first means comprises a 2p-pole alternator having an inductor fixed to the shaft in the vicinity of said second section, and a pick-up feeding a first 2p-pole stator rotating at practically the same speed as the shaft conveying phase information and constituting one of the components of said heteropolar vernier inductor, with the other component being a wheel having $p \pm 1$ teeth.

In a variant, said first means is a non-twistable elongate element fixed to a part which is fixed to said shaft in the vicinity of said second section, and extending between said second and first sections so as to mechanically transmit the phase of the second section to the first.

Advantageously, said elongate element is a tube coaxial with the shaft.

The invention will be properly understood from the following description of various embodiments of the invention given with reference to the accompanying drawings, in which:

FIG. 8 is a diagram of a fourth variant torquemeter.

FIG. 1 is described above in the discussion of the prior art.

FIG. 2 is a diagram explaining the principles on which a torquemeter in accordance with the invention is made and operates.

Figure 1:
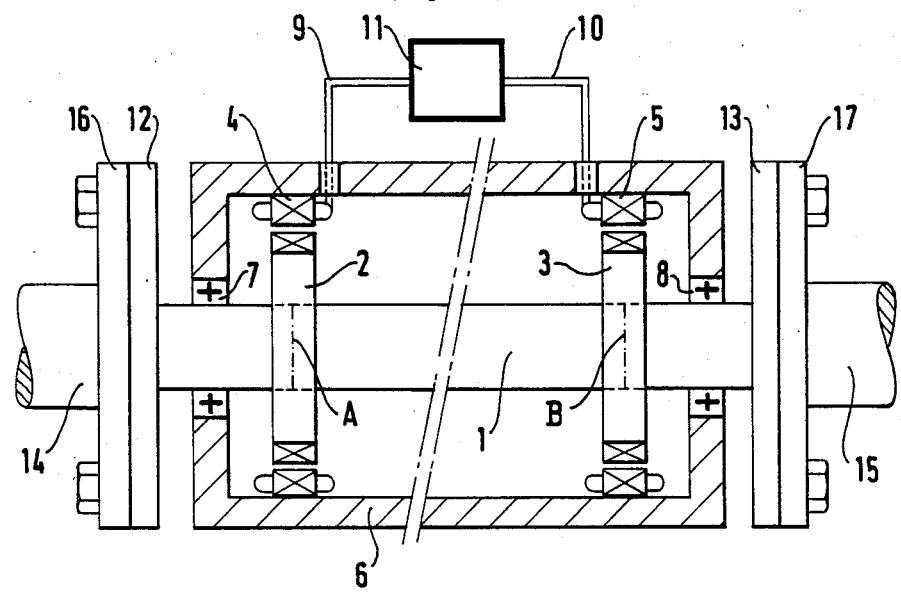
FIG. 1 is a diagrammatical view of a prior art torquemeter.

The items grouped by curly brace I are fixed to the shaft 20 and rotate with the shaft.

The items grouped together by curly brace II are stationary.

A member 21 is located at section B to provide a measurement of the phase at B. This measurement is transmitted by a member 22 which is fixed to the shaft at 21 and is received in a heteropolar vernier inductor 23, 24 which is fixed to the shaft and which amplifies the twist in the shaft by transforming it into the form of a phase shift of first magnetic induction 25 which is constrained to rotate with the shaft.

This induction is received by a bi-polar receiver 28.

A member 26 fixed to the shaft provides a phase reference in the form of induction 27 which member 26 is constrained to rotate in fixed relationship with the shaft and which induction is received by a stationary bi-polar receiver 29.

A phase comparator 30 connected to the outputs from the receivers 28 and 29 provides information which is proportional to phase shift, and thus to the twist angle.

The use of a heteropolar vernier inductor provides very high measurement accuracy. Assume that the vernier inductor comprises a ring 23 of 2p magnetic poles co-operating with toothing 24 having $p \pm 1$ teeth, and that a phase shift $\phi$ at B is communicated by the member 22 to one of the components of the heteropolar vernier inductor.

Because of the vernier effect, the 2p magnetic poles are transformed into a pair of magnetic poles or macropoles which are phase shifted by $p\phi$.

The phase reference member 26 may be a bi-polar alternator.

In this case, and further assuming that the accuracy limit of the phasemeter is given by a smallest time interval $dt_0$ between the waves 25 and 27, then the smallest twist angle $\phi_1$ which can be detected is related to $dt_0$ by the equation:

$$dt_0 \leq p\phi_1/2\pi N$$

With reference to above equation (1) it can be seen that $\phi_1$ is related to $\phi_0$ by the equation:
$$\phi_1 = \phi_0/p \quad (3)$$

Equation (3) means that measurement accuracy is increased by a multiplicative factor equal to p.

The number p may easily be as much as 50 or even more, thereby demonstrating that the accuracy of the apparatus can be considerably improved over the accuracy of prior art apparatuses, with the reading frequency not exceeding the rotation frequency of the line of shafts.

If the reference member 24 is another heteropolar vernier inductor comprising 2p alternating poles co-operating with a wheel having $p-1$ teeth to which the phase shift between A and B is communicated, then this vernier gives rise to 2 macropoles which are at a phase difference of $-p\phi$.

The measurement sensitivity is thus doubled compared with the above-described case.

It is thus possible for the measurement sensitivity to be more than two orders of magnitudes greater than that of the prior art.

A first embodiment of the invention is now described with reference to FIG. 3.

In this embodiment, the device comprises two heteropolar vernier inductors, and the phase of section B is transmitted thereto by electrical means.

The inductor 47 of an alternator 48 having 2p poles 47A and having a stator pick-up 49 with the same number of poles is fixed to the shaft 40 at point B. The current induced in the pick-up 49 feeds two stators 421 and 52 disposed in the vicinity of section A. Each of these stators is provided with a winding (respectively 42A and 52A) having 2p poles, i.e. having the same number poles as the pick-up 49. As a result, the poles of the alternator pick-up 48 are reproduced in the bores of the stators 42 and 52.

Each of the windings 42A and 52A thus behaves like 2p poles fixed to the shaft and having the phase of point B. They constitute the first portions of the above-mentioned heteropolar vernier inductors.

The stators 42 and 52 are also provided with bi-polar windings 42B and 52B (receivers) whose respective outputs 43 and 53 are connected to a phase comparator 60.

The stators 42, 52, and 49 are disposed in a common magnetic frame 61 which is connected to the shaft via bearings 62 and 63.

In addition to the poles 42A and 52A, the heteropolar vernier inductors include wheels 41 and 51 having respective toothed rings 44 and 45 with the ring 44 having $p-1$ teeth and the ring 45 having $p+1$ teeth. Advantageously, the rings are connected to the shaft via a common disk 64 which is welded to the shaft.

Figure 2:
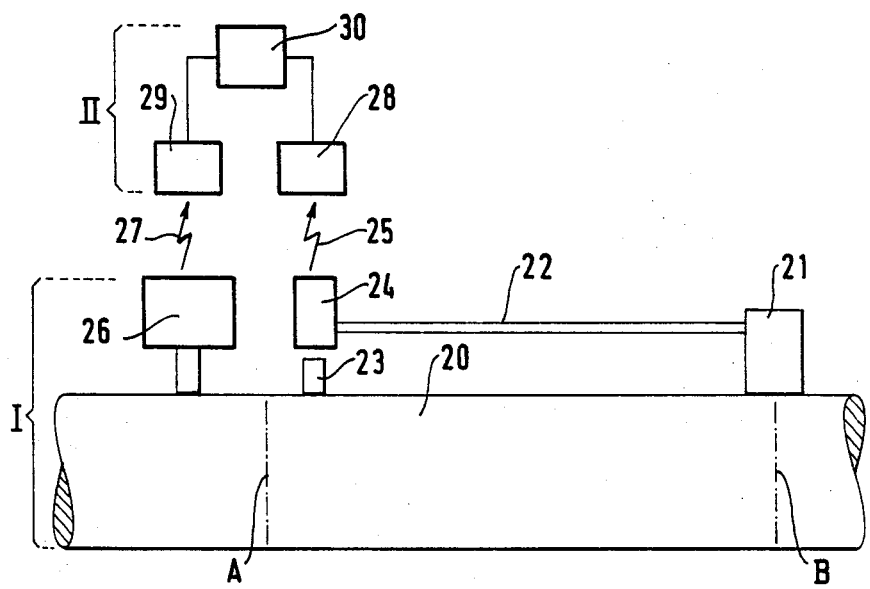
FIG. 2 is a diagram explaining the principles on which a torquemeter in accordance with the invention is based and operates.

The operation of the above-described torquemeter is identical to that of the meter whose principles were explained with reference to FIG. 2.

Figure 4:
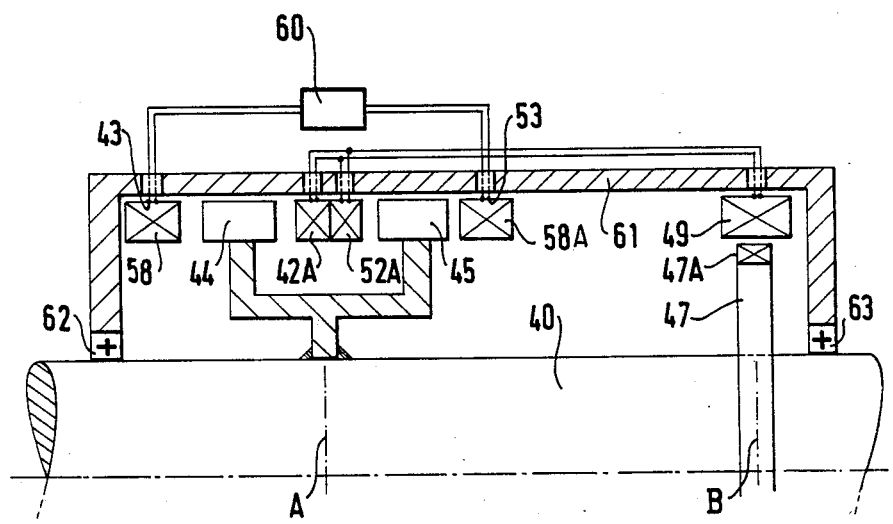
FIG. 4 is a diagram of a first variant torquemeter.

FIG. 4 shows a variant embodiment in which the 2p pole windings are the bi-polar windings are disposed on either side of the toothed rotors.

Figure 3:
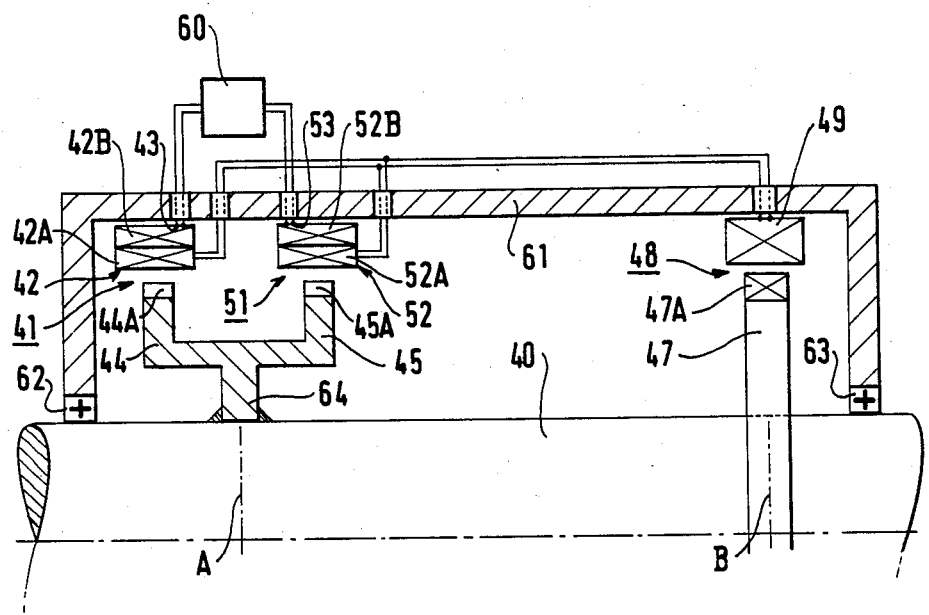
FIG. 3 is a diagram of a first embodiment of a torquemeter in accordance with the invention.

Items which are common in FIGS. 3 and 4 have the same reference numerals. The bi-polar windings (receives) are now referenced 58 and 58A. In this embodiment flux passes through the air gap parallel to the axis AB.

The proximity of the teeth and the receivers provides better smoothing of the output voltages applied to the comparator. The smoothing can be further improved by judiciously inclining the stator toothing.

The two embodiments described with reference to FIGS. 3 and 4 are suitable for torquemeters intended for measuring torque in lines of large diameter shafts rotating at relatively low speeds (less than 3,000 revolutions per minute (rpm)).

Slotted magnetic circuit technology is preferably used for containing the pick-up conductors.

Slots are unsuitable for smaller diameter apparatuses (less than 70 mm–80 mm), and in that case the variant embodiment described below with reference to FIG. 5 may be used.

A disk 71 is welded to a shaft 70 at section B, and a tube 72 extends coaxially around the shaft to beyond section A.

This non-twistable tube serves to transmit the phase of the twist existing at section B from B to A.

In the vicinity of point A, the tube 72 is surrounded by two bi-polar stator windings 73 and 74. Embedded in its thickness, the tube carries two rings 75 and 76 of 2p permanent magnets disposed with alternating polarity. Two rings of teeth 77 and 78 fixed to the shaft 70 via a common disk 79 are disposed facing respective ones of the rings of magnets 75 and 76.

The ring of teeth 77 has $p \pm 1$ teeth and the ring 78 has $p-1$ teeth.

The stators 73 and 74 are fixed to a frame 80 which is connected to the shaft via bearings 81 and 82.

An optional bearing 83 serves to guide the tube 72. The bi-polar windings are electrically connected to a phase comparator 85.

The heteropolar vernier inductors are thus constituted in this case firstly by the ring of magnets 75 and the ring of teeth 77, and secondly by the ring of magnets 76 and the ring of teeth 78.

The operation of the torquemeter is entirely analogous to that of the above-described double vernier torquemeters.

Figure 5:
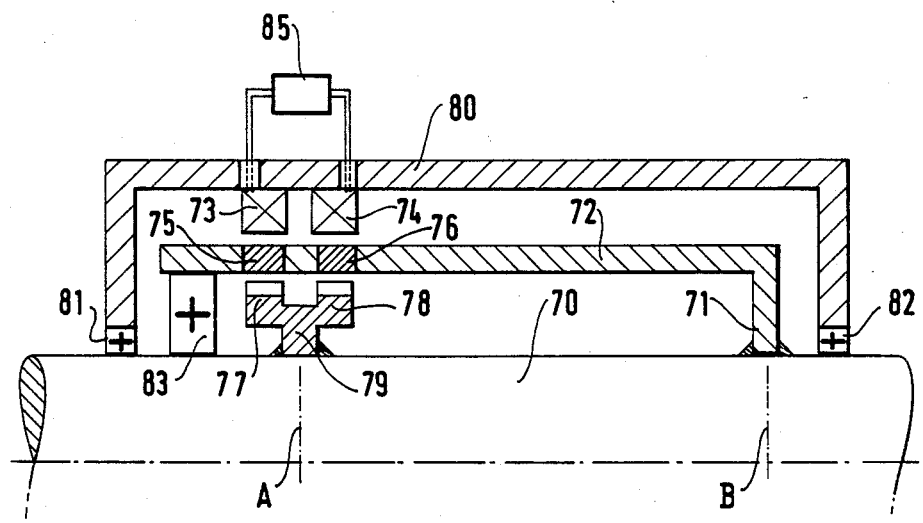
FIG. 5 is a diagram of a second variant torquemeter.
Figure 6:
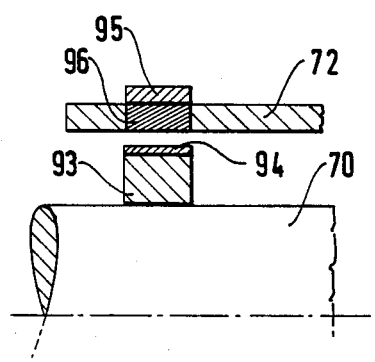
FIG. 6 is a diagram of a damper which may be fitted to the torquemeter.

Advantageously, as shown in FIG. 6, where items common to FIG. 5 have the same reference numerals, the shaft may be fitted with a magnetic slug 93 covered with a layer 94 made of a good conductor of electricity. The tube 72 is surrounded by a solid slug 95 and is provided with a ring of small alternating magnets 96. This assembly constitutes an eddy current damper for twisting vibration.

Figure 7:
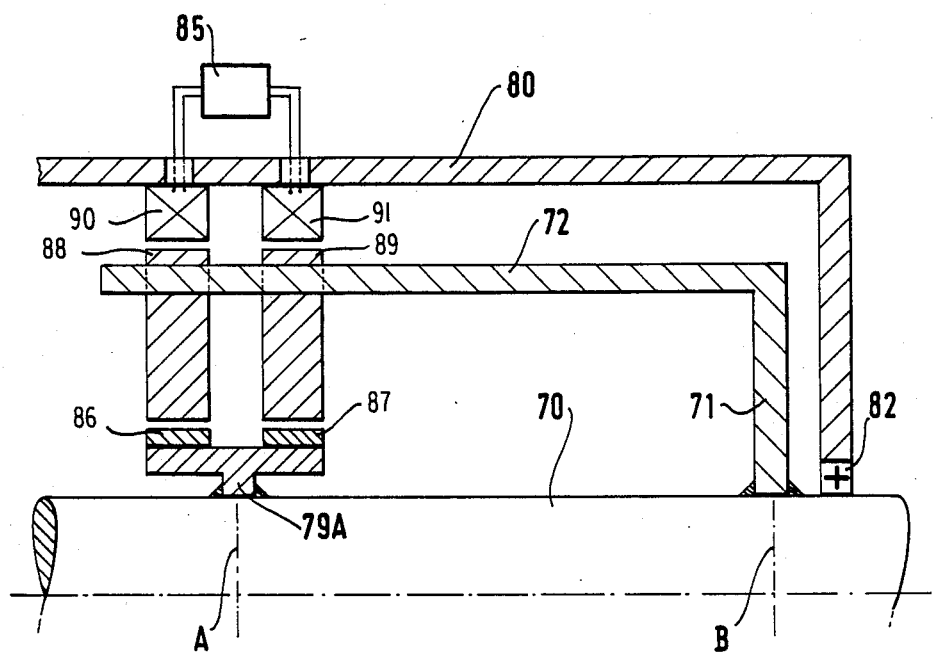
FIG. 7 is a diagram of a third variant torquemeter.

In the variant embodiment shown in FIG. 7, items which are common to FIGS. 5, 6 and 7 have the same reference numerals.

In this case, the rings of magnets 86A and 87A are connected to the shaft by a support 79A. The groups of p−1 and of p±1 teeth 88 and 89 use the tube 72 as a wheel rim and pass through it radially.

Magnetic flux is transmitted as before to the receivers 90 and 91.

In all of the above-described embodiments, the roles of the sections A and B may be interchanged.

The interaction between the phases at A and B by means of a vernier heteropolar inductor may be performed at any position along the shaft AB.

The components of the torquemeter may be mounted directly on the shaft to be monitored. In a variant, the torquemeter may be mounted on a length of shaft provided with end flanges to enable it to be inserted in a line of shafts to be monitored.

Although the examples described with reference to FIGS. 5 to 7 make use of a tube, it will be understood that the tube may be replaced by some other non-twistable elongate element, for example an arm or a plurality of arms interconnected to constitute a slotted tube.

FIG. 8 is a diagram of a torquemeter for use in measuring the twist of a shaft which is only slightly twistable.

A pick-up 97 having N pairs of poles is fixed to the shaft at B. It is opposite a rotary inductor 98 having N poles constituted by magnets, for example. The induced currents set up N pairs of poles rotating at the speed of the inductor.

These currents are conveyed by connections (not shown) to two corresponding pick-ups 99 and 100 which are connected to the shaft 110 at A and which faces two sets of magnetic teeth 101 and 102 having N+1 and N−1 teeth respectively, said sets of teeth rotating at exactly the same speed as the inductor.

This provides two vernier assemblies of amplification ±N rotating at said speed. When B twists relative to A, the poles at A are offset through an angle φ, and the relative phase difference between the rotating macropoles of the two systems is 2Na.

These macropoles induce two voltages in associated stationary receivers 75A and 75B from which the phase difference 2Na is measured.

The inductor and the two sets of teeth rotating at the same speed are driven, where possible, by a single motor 105, 105′ whose shaft 106 twists very little. Reference 107 designates the stator frame.

If two separate synchronous motors are required, they should be fed in series and an auxiliary winding should be used to servo-control the position of the second motor to the same angle as the first.

The above-described device can measure twists in a shaft at very low speeds of shaft rotation, and also when stationary. This makes it possible to calibrate the shaft.

I claim:
1. A device for measuring an angle of twist between first and second sections (A, B) of a shaft, while the shaft is rotating, the device being characterized in that it comprises:
   first means (21) fixed to the shaft at said second section for generating information representative of the phase at said second section and transmitting said information to the vicinity of said first section;
   a first heteropolar vernier inductor (23, 24) including a component which is fixed to said shaft at said first section for receiving said information from said first means and transmitting said information in the form of a first resulting magnetic induction (25);
   a first stationary bi-polar receiver (28) picking up said first magnetic induction and providing an output signal;
   a secondary stationary bi-polar receiver (29) picking up second magnetic induction (27) provided by second means (26) on the shaft and providing an output signal constituting a phase reference; and
   a phase comparator (30) receiving said output signals from said receivers at inputs thereof and providing an output signal proportional to the phase difference between said signals, and thus to said angle of twist.

2. A device according to claim 1, characterized in that said first heteropolar vernier inductor comprises a ring of 2p alternating poles (23) together with magnetic toothing comprising p±1 teeth (24).

3. A device according to claim 1 or 2, characterized in that said second means is a heteropolar vernier inductor comprising a ring of 2p poles and cooperating with magnetic toothing comprising p±1 teeth.

4. A device according to claim 1, characterized in that said first means comprises a 2p-pole alternator (48) having an inductor (47) connected to the shaft in the vicinity of said second section, and a pick-up (49) feeding a first 2-pole stator (42) rotating at practically the same speed as the shaft, carrying phase information and constituting one of the components of the first heteropolar vernier inductor, said pick-up feeding a second 2p pole stator (52) rotating at practically the same speed as the shaft, carrying phase information and constituting one of the components of a second heteropolar vernier inductor, the other components being respectively a magnetic wheel (41) having p±1 teeth and a magnetic wheel (51) having p±1 teeth.

5. A device according to claim 1 or 2, wherein said second means is a 2p-pole alternator.

6. A device according to claim 5, characterized in that the first means comprises a 2p-pole alternator having an inductor fixed to the shaft in the vicinity of said second section, and a pick-up feeding a first 2p pole stator rotating at practically the same speed as the shaft, conveying phase information and constituting one of the components of said heteropolar vernier inductor, the other component being a wheel comprising p±1 teeth.

7. A device according to claim 1, wherein said first means is an elongate non-twistable element fixed to a part which is fixed to said shaft in the vicinity of said second section, and extending between said second and first sections in such a manner as to mechanically transmit the phase of the second section to the first section.

* * * * *